Oct. 13, 1942.   W. M. ASHBY   2,298,265
HORSE'S MUZZLE
Filed Sept. 24, 1941

Inventor
WINFREY M. ASHBY
By Thomas W. Y. Clark
Attorney

Patented Oct. 13, 1942

2,298,265

UNITED STATES PATENT OFFICE 2,298,265

HORSE'S MUZZLE

Winfrey M. Ashby, Howard County, Md.

Application September 24, 1941, Serial No. 412,091

3 Claims. (Cl. 119—33)

This invention relates to a muzzle for use primarily on riding horses and the objects thereof are to provide a light, soft muzzle which will not annoy the horse and yet which will prevent the horse from nibbling at grass and branches of trees and bushes or other objects which might attract its attention. Another object is to provide a muzzle that may be placed over the horse's mouth after the bridle has been placed on and which will not interfere with the use of the bridle or bits and which will not become entangled with the bits, curb chain and reins. Another object is to provide a muzzle which will allow as much freedom to the horse's lower jaw as possible. Other objects of the invention will appear hereafter.

Figure 1:
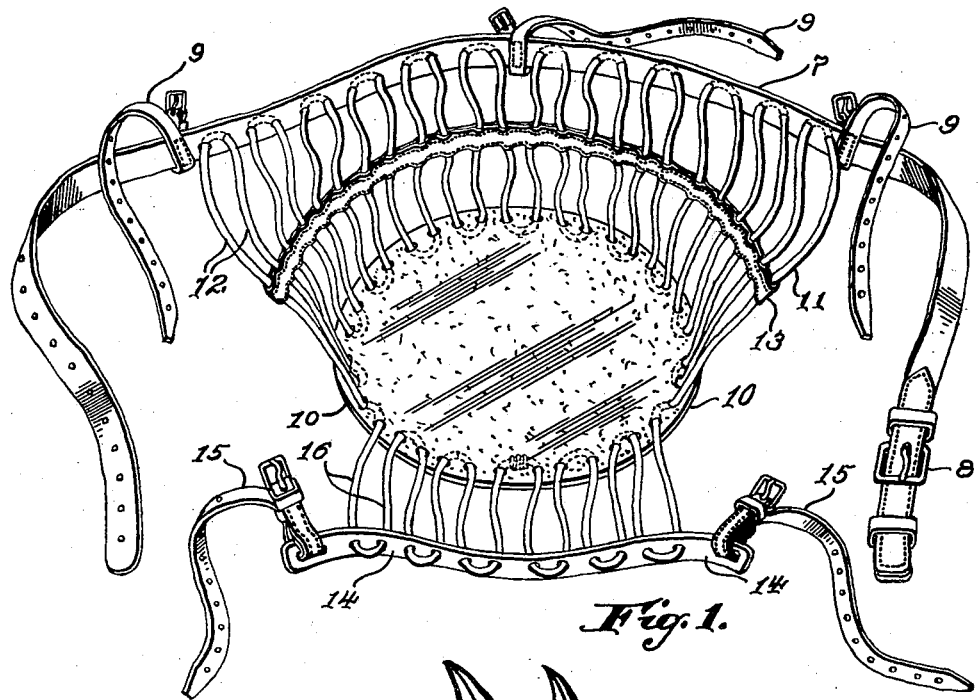

The novel features which are characteristic of the present invention are set forth with particularity in the appended claims. The invention itself, however, will best be understood from reference to the following specification when considered in connection with the accompanying drawing forming a part hereof and in which, Figure 1 is a perspective view of the muzzle before attachment to the bridle of the horse.

Figure 2:
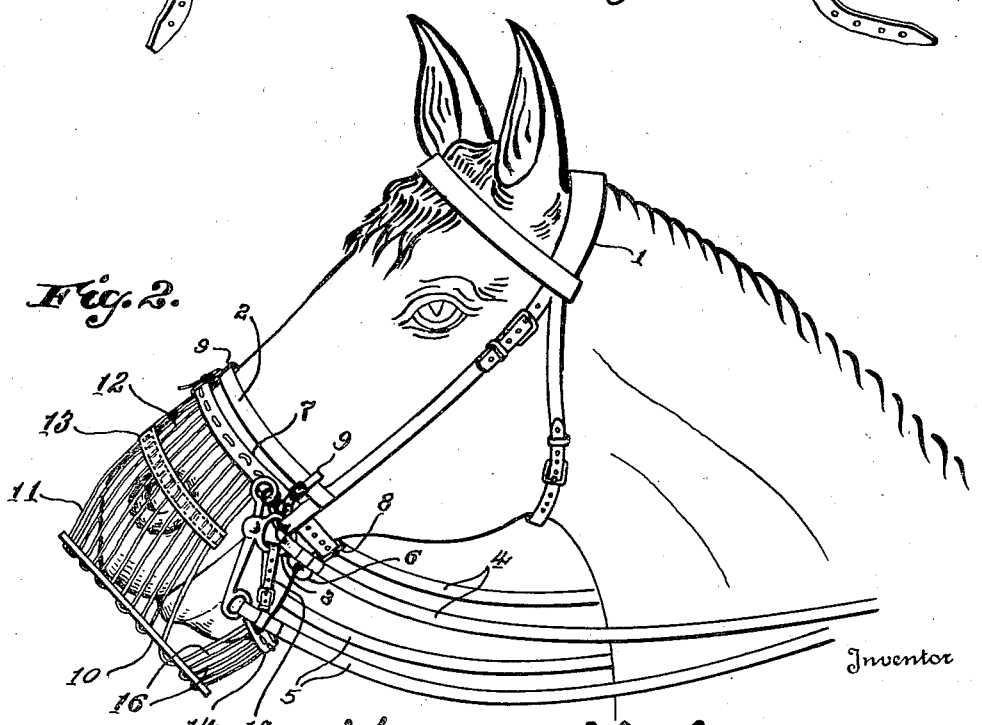

Figure 2 is a side view of the muzzle as the same is attached to the bridle of a horse.

The muzzle is intended to be attached to the bridle strapped to the horse's head. The bridle I has a nose strap 2 and bit rings 3. The bridle is shown equipped with a Pelham riding bit having two sets of reins 4 and 5, and curb chain 6.

The muzzle consists of a band 7 adapted to be buckled around the horse's head by means of buckle 8. The band 7 has a plurality of smaller straps 9 stitched thereon equipped with buckles by which it is attached to the nose strap 2 of the bridle. The cover 10 preferably made of leather forms the bottom of the muzzle and this cover is attached to the band 7 by means of cords 11. These cords are looped by long loops 12 through holes in the band 7 and cover 10. It is preferable that a single continuous length of cord be used in order to make the muzzle as light as possible.

The long loops attached to the band 7 likewise have a spacer 13 sewed intermediately of their length between the band 7 and cover 10 to maintain the cords in proper spaced position around the horse's nose.

The strap 14 with smaller straps 15 at its ends, attachable to the rings 3 of the bridle, is likewise connected with the cover 10 by means of shorter loops 16 of the cords 11. The separating of the cords into the two sets of loops leaving the spaces on each side of the horse's mouth, allows the horse to open its mouth and prevents any interference with the bit and the reins. The open structure of the loops of the cord allows perfect freedom in breathing.

The muzzle can of course be used on a halter which has side rings and a nose band or nose strap.

The muzzle is light, inexpensive to manufacture and effectively prevents the horse from nibbling or biting.

What is claimed as new and is desired to be secured by Letters Patent is:

1. A muzzle for attachment to a bridle having bit rings and a nose strap, consisting of a band having means thereon to attach the same to the bridle nose strap, a cover to extend over the animal's mouth, spaced cords extending from the upper outline of the cover and connected to said band, a chin strap spaced from said band and allowing freedom of movement of the animal's lower jaw and having means thereon to attach the same to the bridle bit rings, and spaced cords extending from the lower outline of the cover to said chin strap the cords on the chin strap being substantially spaced from the cords on the band to avoid interference with the bridle and bit.

2. A muzzle for attachment to a bridle having bit rings and a nose strap, consisting of a band having means thereon to attach the same to the bridle nose strap, a cover to extend over the animal's mouth, spaced cords extending from the upper and side portions of the periphery of the cover and connected to the upper and side portions of said band, a chin strap spaced from said band and cords and allowing freedom of movement of the animal's lower jaw, and having means thereon to attach the same to the bridle bit rings, and spaced cords extending from the lower portion of the periphery of the cover to said chin strap the cords on the chin strap being substantially spaced from the cords on the band to avoid interference with the bridle and bit.

3. A muzzle for attachment to a bridle having bit rings and a nose strap, consisting of a band having means thereon to attach the same to the bridle nose strap, a cover to extend over the animal's mouth, spaced cords extending from the upper and side portions of the periphery of the cover and connected to said band, means connecting the cords together intermediate the cover and band to maintain the spacing of the cords over the animal's nose, a chin strap spaced from said band and cords and allowing freedom of movement of the animal's lower jaw, and having means thereon to attach the same to the bridle bit rings, and spaced cords extending from the lower portion of the periphery of the cover to said chin strap the cords on the chin strap being substantially spaced from the cords on the band to avoid interference with the bridle and bit.

WINFREY M. ASHBY.